US008270597B2

(12) United States Patent  
Downing et al.

(10) Patent No.: US 8,270,597 B2  
(45) Date of Patent: *Sep. 18, 2012

(54) MICROPHONE ASSEMBLY

(75) Inventors: Mike Downing, Mountain View, CA (US); Robert Jetter, Pleasanton, CA (US)

(73) Assignee: ShoreTel, Inc., Sunnyvale, CA (US)

( * ) Notice: Subject to any disclaimer, the term of this patent is extended or adjusted under 35 U.S.C. 154(b) by 93 days.

This patent is subject to a terminal disclaimer.

(21) Appl. No.: 12/877,713

(22) Filed: Sep. 8, 2010

(65) Prior Publication Data

US 2011/0007891 A1   Jan. 13, 2011

Related U.S. Application Data

(63) Continuation of application No. 12/246,996, filed on Oct. 7, 2008, now Pat. No. 7,817,798.

(51) Int. Cl.  
*H04M 1/00* (2006.01)  
*H04M 9/00* (2006.01)  
*H04R 9/08* (2006.01)

(52) U.S. Cl. .................. 379/433.03; 381/355

(58) Field of Classification Search .......... 379/419, 379/433.03; 381/360, 369, 361, 355, 356, 381/359; 181/171, 158, 166; 455/575.1  
See application file for complete search history.

(56) References Cited

U.S. PATENT DOCUMENTS

| 6,826,284 | B1 | 11/2004 | Benesty et al. |
| 7,817,798 | B2 | 10/2010 | Downing et al. |
| 2007/0263845 | A1 | 11/2007 | Hodges et al. |
| 2008/0159575 | A1 | 7/2008 | Chu et al. |

OTHER PUBLICATIONS

International Search Report Application No. PCT/US2009/058234 mailed on Nov. 17, 2009; 2 pages.  
Written Opinion Application No. PCT/US2009/058234 mailed on Nov. 17, 2009; 7 pages.  
Notice of Allowance for U.S. Appl. No. 12/246,996 mailed on Jul. 19, 2010; 5 pages.  
Non-Final Office Action for U.S. Appl. No. 12/246,996 mailed on Mar. 24, 2010; 11 pages.

*Primary Examiner* — Tuan Nguyen  
(74) *Attorney, Agent, or Firm* — Kilpatrick Townsend & Stockton LLP

(57) ABSTRACT

A microphone assembly includes a microphone array carrier having a top surface and a plurality of side faces adjacent to the top surface. The top surface and the plurality of side faces each have a substantially planar portion. The substantially planar portion of each of the side faces extends substantially perpendicular to the substantially planar portion of the top surface. Each side face has a side opening extending through the side face and the top surface has a top opening extending through the top surface. The microphone assembly also includes a plurality of microphones corresponding to the side faces. Each microphone is mounted with a microphone boot in a side opening and is isolated from the microphone array carrier by the microphone boot. The microphone assembly also includes a housing extending around the microphone array carrier and sound isolating material disposed between the microphone array carrier and the housing.

24 Claims, 2 Drawing Sheets

MICROPHONE ASSEMBLY

CROSS-REFERENCE TO RELATED APPLICATIONS

This application is a continuation of U.S. patent application Ser. No. 12/246,996, entitled "Compact Beamforming Microphone Assembly," filed Oct. 7, 2008, the content of which is incorporated herein by reference in its entirety for all purposes.

BACKGROUND

Beamforming is a signal processing technique used in sensor arrays, for example arrays of microphones, for directional signal reception and appropriate signal processing of the received acoustical signals. Beamforming allows an assembly of microphones receiving acoustical signals to have the resulting electrical signals selectively processed, for example, treating acoustical information from one source differently than acoustical information from a different source. In contrast to omni-directional microphone assemblies which receive and process sounds uniformly regardless of source or direction, beamforming allows signals arriving from different locations to be treated differently before transmission or amplification. Beamforming allows detection of particular signals of interest by use of special filtering and interference rejection.

One potential application of beamforming microphones is in conference telephony. In conference telephony individuals may be arrayed about a room at different locations and distances from a conference telephone. The voices of some individuals may reach the microphone directly, while voices from other individuals further from the microphone may reach the microphone directly and via multiple other paths, such as by reflections off walls or windows in the room. In addition, there may be background noise originating from sources outside the room. With the use of advanced signal processing techniques, individual voices within the room may be selected and selectively processed or amplified before transmission to other parties participating in the telephone call. Background noises may be suppressed, and the relative volumes of voices equalized before transmission. A more detailed discussion of beamforming is in "A Primer on Digital Beamforming," T. Haynes, Spectrum Signal Processing, Mar. 26, 1988 (www.spectrumsignal.com).

One disadvantage of conventional beamforming microphone arrays is their size. Typically such arrays require a relatively large footprint, often about a foot square, as typified by conventional conference room telephones. A further disadvantage of conventional beamforming microphone arrays has been the cost. Conventional conference telephones cost hundreds of dollars, precluding their use in many applications where they would be otherwise suitable. Accordingly, there is a need for a compact, low-cost, beamforming microphone array, for example as might be used with a conventional desk or office telephone.

SUMMARY

This invention relates to beamforming microphone arrays, and in particular to a compact, low cost microphone assembly. In one implementation, the microphone assembly includes a microphone array carrier having a top surface and a plurality of side faces adjacent to the top surface. The top surface and the plurality of side faces each have a substantially planar portion. The substantially planar portion of each of the plurality of side faces extends substantially perpendicular to the substantially planar portion of the top surface. Each side face has a side opening extending through the side face. The top surface has a top opening extending through the top surface.

The microphone assembly also includes a plurality of microphones corresponding to the plurality of side faces. Each microphone is mounted with a microphone boot in a side opening and is isolated from the microphone array carrier by the microphone boot. The microphone assembly also includes a housing extending around the microphone array carrier and sound isolating material disposed between the microphone array carrier and the housing to acoustically isolate each of the plurality of microphones.

In another implementation a telephone is provided with a microphone assembly as described above. The small size of the assembly allows it to be provided as an integral part of the telephone without significantly increasing the cost of the telephone or the footprint of the telephone on a user's desk.

DETAILED DESCRIPTION

Figure 1:
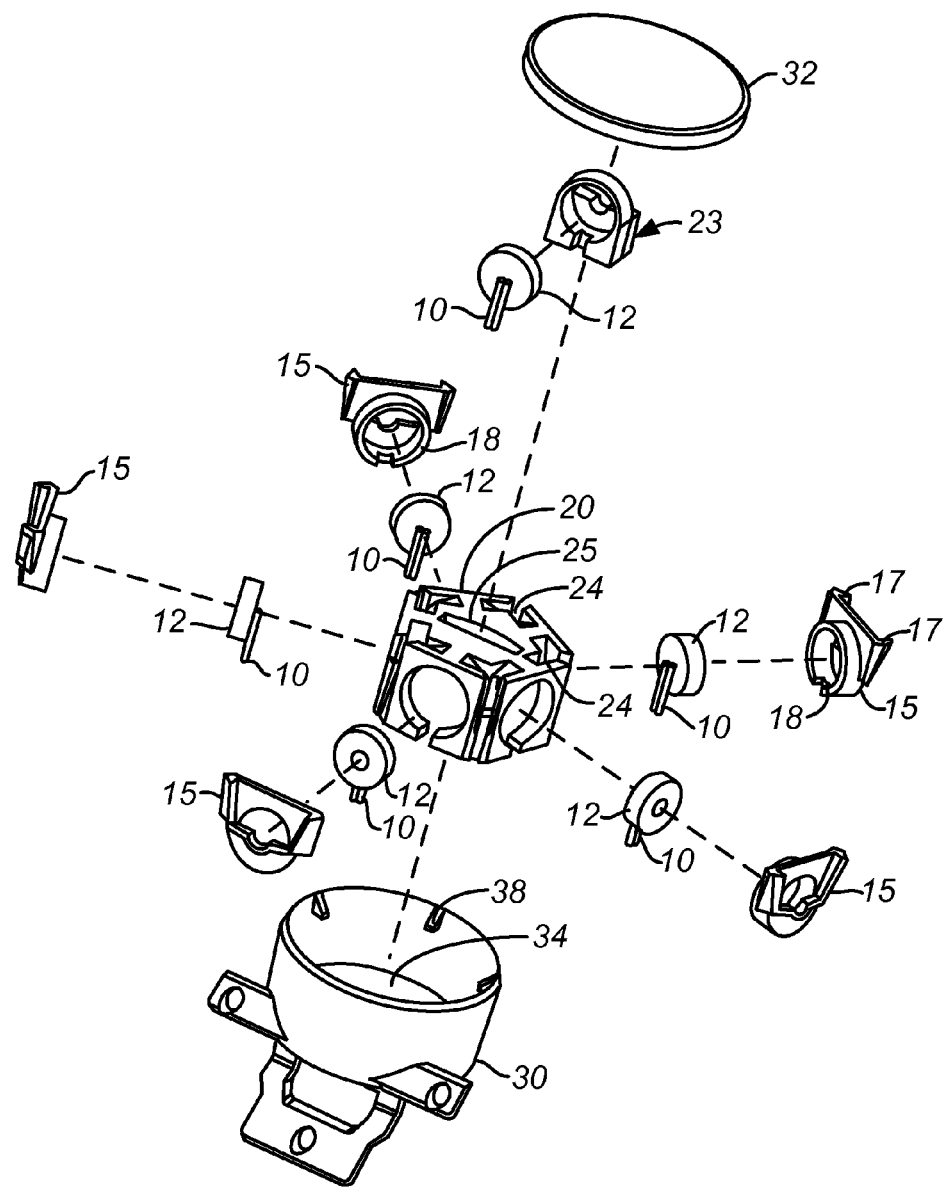
FIG. 1 is an exploded view of a beamforming microphone assembly.

FIG. 1 illustrates the beamforming microphone assembly of this invention in a preferred implementation. The assembly includes six miniature microphones 10, typically microphones such as are available from, for example, MWM Acoustics of Indianapolis, Ind. Each disk-shaped microphone 12 with electrical connector 10 is formed in a small assembly with the sensor portion of the microphone 12 exposed through an opening in the center of the disk. Each microphone assembly fits into a microphone boot 15, preferably rubber or another acoustically opaque compliant material to isolate the microphone from the microphone carrier—as discussed next.

The individual microphone boots 15 then fit into a plastic microphone array carrier 20 which provides a mount for all of the microphone boots 15. Care is taken to seal against potential acoustical leaks from one microphone to the next. To facilitate this, crush ribs 17 are used to seal the microphone boot 15 against the exterior housing 30. In addition, an acoustic seal is made diametrically around the microphone 10 and diametrically from the boot 15 to the carrier 20. This achieved from a press fit of the microphone 12 into the rubber boot on surfaces 18. Although not essential, best performance is achieved by isolating the microphones from all surrounding hard materials to reduce transmission of vibration.

In the assembly depicted, five microphones are arrayed in a pentagonal orientation around the periphery of the microphone array carrier 20. In this arrangement the five outside microphones can use the same design boot, instead of needing a different boot for each microphone. This reduction in unique parts reduces cost of the final assembly. A sixth microphone assembly 23 slides into a central portion 25 of microphone array carrier 20 through an opening in the bottom (not shown) of the array carrier. This microphone assembly 23, when inserted into microphone carrier 20, is angled forward and upward to also detect sounds arriving from a direction perpendicular to the pentagonal orientation of the faces of the microphone array carrier 20. Assembly 23, however, does not face directly upward, but rather is canted to face the front of the assembly, as this is the expected direction of at least one of the likely individuals using the beamforming microphone assembly, that is, the user of a desktop telephone to which the beamforming microphone assembly will be affixed. The central microphone 23 with boot is tilted in microphone array carrier 20, rather than being mounted face up, thereby also reducing the overall dimensions of the assembly. The geometry of the opening in the carrier 20 matches the geometry of the ports formed between each microphone boot 15 and the exterior housing 30 when assembled.

The microphone array carrier 20, with all microphone assemblies correctly positioned, fits into a housing 30 which is adapted to be coupled to a desk telephone, as will be described. Housing 30 typically will be plastic, e.g. of the same type and color as the telephone to which it is attached. The design of the carrier and housing are done so that the central carrier can only be installed in the correct orientation. This causes the same microphone always points the same direction when installed onto the desk telephone. This can be accomplished with snaps or other guiding features 38.

A mesh cover 32 covers the top of the exterior housing surrounding the microphone array carrier 30, enabling sound to reach the microphones while improving the aesthetics of the finished product. The mesh cover also prevents debris or small objects from falling into the microphone ports. The completed assembly of microphones, microphone boots, and the carrier array is isolated from the exterior housing 30 by the crush ribs on the individual microphone boots 17. When completed, the assembly depicted in FIG. 1 is approximately 1.5 inches in diameter and one inch in height.

Figure 2:
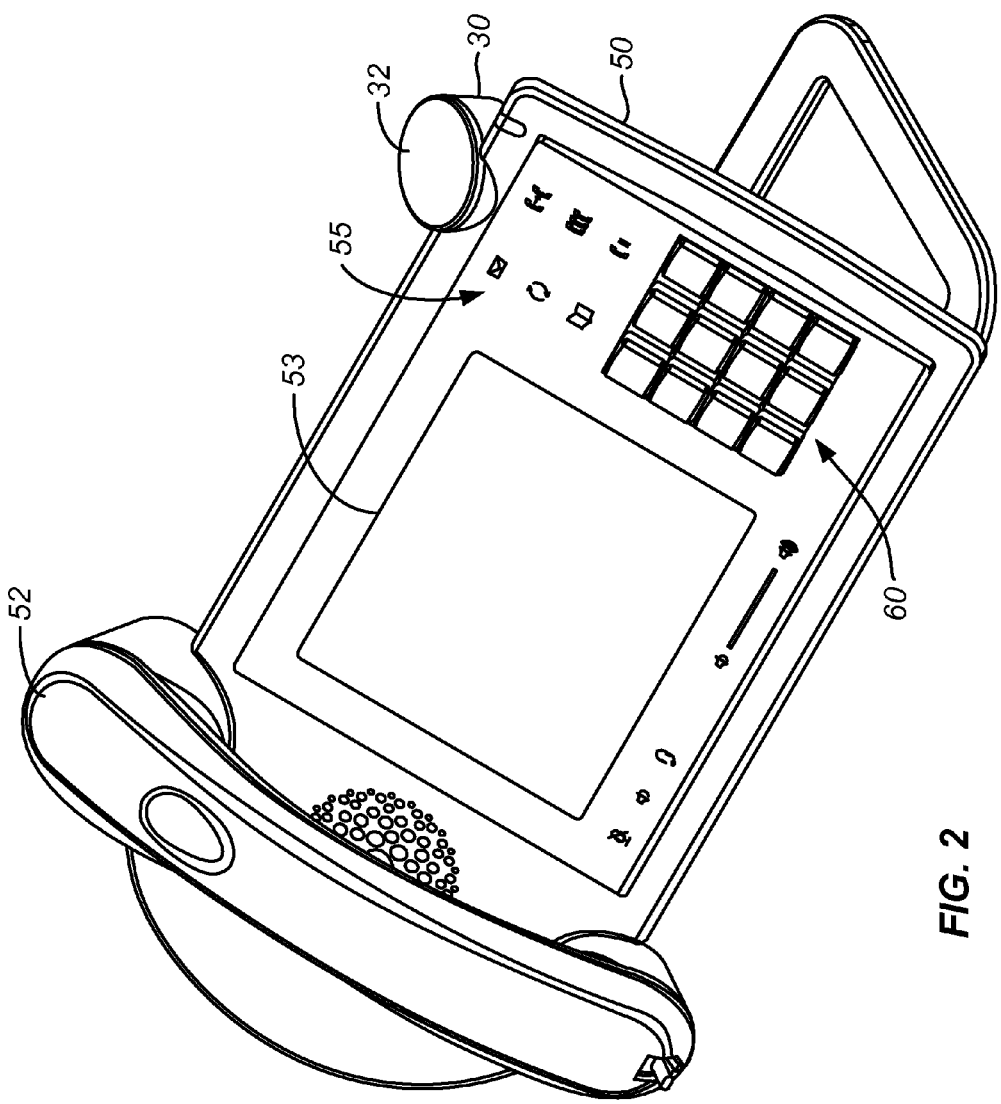
FIG. 2 is a diagram of the apparatus shown in FIG. 1 in place on an office telephone.

FIG. 2 is a perspective view of a typical desk telephone 50 for use in an office, home or other location. The illustration is of a ShoreTel (the assignee of this application) VOiP telephone 50 and includes a handset 52, a display screen 53, various feature choices indicators 55, and a keypad 60. As illustrated in FIG. 2, the beamforming microphone assembly contained within housing 30 beneath cover 32 occupies only a very small portion of telephone 50 itself, fitting easily within the available footprint of the telephone. In this manner, conference telephony capability is provided for a conventional desk telephone without need of a separate system. Placing the microphone assembly on an upper surface of the desk telephone also places it farther away from distracting sounds of rustling papers. In addition, having one of the microphones oriented to receive sounds from above the telephone, as depicted in FIG. 1, helps in sound processing by enabling easier removal of reflected sounds.

Processing of the sound from the microphone array is performed using well known signal processing techniques implemented in commercially available integrated circuits. One such implementation uses the signal processing techniques described in U.S. Pat. No. 6,826,284, entitled, "Method and Apparatus for Passive Acoustic Source Localization for Video Camera Steering Applications." That patent describes a real-time passive acoustic source localization system for video camera steering. The system described therein operates by determining the relative delay between the direct paths of two estimated channel impulse responses. Using a specialized algorithm, the system makes a determination of the acoustic source location. The sound from that location then may be further processed as desired.

The beamforming microphone assembly described herein enables the directional sound processing, suppression of background noise, and equalization of volume from the voices of many different individuals arrayed around the telephone 50. It enables individuals participating in a call to move about the room, yet have their voices continue to be presented to a listener with clarity and appropriate volume.

Although the preferred embodiments of the invention have been described above, it will be appreciated that various modifications may be made to the beamforming microphone assembly described without departing from the scope of the invention. For example, in the embodiment illustrated, six microphones have been employed. If differing degrees of precision of sound location and equalization are desired, more or fewer microphones may be employed. In addition, the microphone assembly may be adapted to be used in conjunction with other types or styles of telephones than the one illustrated, or implemented as stand-alone apparatus separate from the telephone. for example, the microphone assembly can be used to provide portable conference calling capability by forming it as a discrete unit and then coupling it to a cellular telephone. This coupling can use a wired connection to a jack or USB port on the cellular telephone, or by a wireless connection, for example, using Bluetooth technology.

What is claimed is:

1. A microphone assembly comprising:
    a microphone array carrier having a top surface and a plurality of side faces adjacent to the top surface, the top surface and the plurality of side faces each having a substantially planar portion, the substantially planar portion of each of the plurality of side faces extending substantially perpendicular to the substantially planar portion of the top surface, each side face having a side opening extending through the side face and the top surface having a top opening extending through the top surface;
    a plurality of microphones corresponding to the plurality of side faces, each microphone mounted with a microphone boot in a side opening and isolated from the microphone array carrier by the microphone boot;
    a housing extending around the microphone array carrier; and
    sound isolating material disposed between the microphone array carrier and the housing to acoustically isolate each of the plurality of microphones.

2. A microphone assembly as in claim 1 wherein each of the plurality of microphones is coupled to an electronic acoustic source localization system.

3. A microphone assembly as in claim 1 further comprising an electrical signal connecting means for electrically communicating information between each of the plurality of microphones and at least one of a telephone or a cellular telephone.

4. A microphone assembly as in claim 1 wherein the housing has a diameter of approximately 1.5 inches and a height of approximately 1.0 inch.

5. A microphone assembly as in claim 1 wherein the housing includes a guide adapted to orient the microphone array carrier relative to the housing.

6. A microphone assembly as in claim 1 further comprising a cover coupled to the housing and extending over the top surface of the microphone array carrier, the cover configured to allow sound to reach the plurality of microphones from outside the housing and the cover.

7. A microphone assembly as in claim 1 wherein the microphone array carrier comprises five side faces arranged in a pentagonal orientation.

8. A microphone assembly as in claim 1 wherein an additional microphone and an additional microphone boot are mounted inside the microphone array carrier with at least a portion of the additional microphone exposed by the top opening to sound arriving at the top surface.

9. A microphone assembly as in claim 8 wherein the additional microphone and the additional microphone boot are substantially identical to the plurality of microphones and microphone boots.

10. A microphone assembly as in claim 1 wherein the top opening is a canted slot and an additional microphone and an additional microphone boot are positioned in the canted slot.

11. A microphone assembly as in claim 10 wherein the additional microphone is canted upward toward the cover and has an acoustical port.

12. A microphone assembly as in claim 1 wherein the microphone assembly is coupled to a telephone.

13. A microphone assembly as in claim 12 wherein the telephone includes a keypad and the cover is no larger than the keypad.

14. A telephone comprising:
an input means coupled to the telephone; and
a microphone assembly coupled to the telephone, the microphone assembly including:
a microphone array carrier having a top surface and a first plurality of side faces adjacent to the top surface, the top surface and the plurality of side faces each having a substantially planar portion, the substantially planar portion of each of the plurality of side faces extending substantially perpendicular to the substantially planar portion of the top surface, each side face having a side opening extending through the side face and the top surface having a top opening extending through the top surface;
a plurality of microphones corresponding to the plurality of side faces, each microphone mounted with a microphone boot in a side opening and isolated from the microphone array carrier by the microphone boot;
a housing extending around the microphone array carrier; and
sound isolating material disposed between the microphone array carrier and the housing to acoustically isolate each of the plurality of microphones.

15. A telephone as in claim 14 wherein microphone array carrier comprises five side faces arranged in a pentagonal orientation.

16. A telephone as in claim 14 wherein the microphone assembly is coupled to an upper surface of the telephone.

17. A telephone as in claim 14 wherein the microphone assembly further comprises a cover coupled to the housing and extending over the top surface, the cover being no larger than the input means.

18. A telephone as in claim 14 wherein each of the plurality of microphones is coupled to an electronic acoustic source localization system.

19. A telephone as in claim 14 wherein the microphone assembly has a diameter of approximately 1.5 inches and a height of approximately 1.0 inch.

20. A telephone as in claim 14 wherein the input means is a keypad.

21. A telephone as in claim 14 wherein the input means is a display screen.

22. A telephone as in claim 14 wherein an additional microphone and an additional microphone boot are mounted inside the microphone array carrier with at least a portion of the additional microphone exposed by the top opening to sound arriving at the top surface.

23. A telephone as in claim 22 wherein the additional microphone and the additional microphone boot are positioned in the top opening.

24. A telephone as in claim 22 wherein the additional microphone is oriented upward to detect sounds arriving from a direction substantially perpendicular to the side faces of the microphone array carrier and oriented forward to detect sounds arriving from a direction substantially in a front of the telephone.

* * * * *